(12) United States Patent
Kuribayashi

(10) Patent No.: US 11,394,036 B2
(45) Date of Patent: Jul. 19, 2022

(54) FUEL CELL POWER GENERATION UNIT AND FUEL CELL STACK

(71) Applicant: MORIMURA SOFC TECHNOLOGY CO., LTD., Komaki (JP)

(72) Inventor: Makoto Kuribayashi, Ichinomiya (JP)

(73) Assignee: MORIMURA SOFC TECHNOLOGY CO., LTD., Komaki (JP)

( * ) Notice: Subject to any disclaimer, the term of this patent is extended or adjusted under 35 U.S.C. 154(b) by 274 days.

(21) Appl. No.: 16/077,901

(22) PCT Filed: Nov. 10, 2016

(86) PCT No.: PCT/JP2016/083446
§ 371 (c)(1),
(2) Date: Aug. 14, 2018

(87) PCT Pub. No.: WO2017/145451
PCT Pub. Date: Aug. 31, 2017

(65) Prior Publication Data
US 2019/0051914 A1  Feb. 14, 2019

(30) Foreign Application Priority Data
Feb. 26, 2016 (JP) .............................. JP2016-035136

(51) Int. Cl.
*H01M 8/0245* (2016.01)
*H01M 8/1246* (2016.01)
(Continued)

(52) U.S. Cl.
CPC ............ *H01M 8/0245* (2013.01); *H01M 8/02* (2013.01); *H01M 8/0202* (2013.01); *H01M 8/12* (2013.01);
(Continued)

(58) Field of Classification Search
CPC ................... H01M 2008/1293; H01M 8/0245
See application file for complete search history.

(56) References Cited

U.S. PATENT DOCUMENTS

| 5,942,349 A | * | 8/1999 | Badwal | ............... | H01M 8/0208 |
| | | | | | 429/495 |
| 2007/0166604 A1 | * | 7/2007 | Katagiri | ............. | H01M 4/8621 |
| | | | | | 429/441 |

(Continued)

FOREIGN PATENT DOCUMENTS

| DE | 10-2005-015755 A1 | 10/2006 |
| JP | 2006-92837 A | 4/2006 |

(Continued)

OTHER PUBLICATIONS

International Search Report (PCT/ISA/210) dated Jan. 24, 2017 issued by the International Searching Authority in counterpart International Application No. PCT/JP2016/083446.

(Continued)

*Primary Examiner* — Sadie White
(74) *Attorney, Agent, or Firm* — Sughrue Mion, PLLC

(57) ABSTRACT

A fuel cell electricity generation unit including a unit cell including an electrolyte layer containing a solid oxide, and a cathode and an anode which face each other with the electrolyte layer intervening therebetween; an electrically conductive current collecting member disposed on the cathode side of the unit cell; an electrically conductive coating which covers the surface of the current collecting member; and an electrically conductive bonding layer which bonds the cathode to the current collecting member covered with the coating, wherein the following relationship is satisfied: the porosity of the coating<the porosity of the bonding layer<the porosity of the cathode.

5 Claims, 8 Drawing Sheets

| Sample | Relation of porosity | Relation of thermal expansion coefficient | Condition 1 | Condition 2 |
|---|---|---|---|---|
| A | 1 | 11 | O | O |
| B | 1 | 12 | O | X |
| C | 1 | 13 | O | X |
| D | 2 | 11 | X | X |
| E | 2 | 12 | X | X |
| F | 2 | 13 | X | X |
| G | 3 | 11 | X | X |
| H | 3 | 12 | X | X |
| I | 3 | 13 | X | X |

(51) Int. Cl.
    *H01M 8/02*         (2016.01)
    *H01M 8/12*         (2016.01)
    *H01M 8/0202*     (2016.01)
    *H01M 4/86*         (2006.01)

(52) U.S. Cl.
    CPC .. *H01M 8/1246* (2013.01); *H01M 2004/8689* (2013.01); *H01M 2008/1293* (2013.01)

(56) References Cited

U.S. PATENT DOCUMENTS

| | | | |
|---|---|---|---|
| 2009/0155667 A1* | 6/2009 | Kiefer | H01M 8/0228 |
| | | | 429/457 |
| 2009/0169958 A1* | 7/2009 | Lin | H01M 8/2432 |
| | | | 429/496 |
| 2009/0194223 A1* | 8/2009 | McCarthy | H01M 8/0271 |
| | | | 156/89.16 |
| 2009/0297917 A1 | 12/2009 | Higashi et al. | |
| 2010/0167164 A1* | 7/2010 | Reilly | H01M 4/8889 |
| | | | 429/485 |
| 2011/0003235 A1 | 1/2011 | Hwang et al. | |
| 2011/0111327 A1 | 5/2011 | Ohmori et al. | |
| 2012/0308915 A1* | 12/2012 | Park | H01M 4/9033 |
| | | | 429/496 |
| 2013/0288149 A1 | 10/2013 | Higashi et al. | |
| 2014/0023957 A1* | 1/2014 | Brandner | H01M 8/0236 |
| | | | 429/509 |
| 2014/0051006 A1* | 2/2014 | Hwang | H01M 8/1213 |
| | | | 429/481 |
| 2015/0318563 A1* | 11/2015 | Kuribayashi | H01M 8/0273 |
| | | | 429/482 |
| 2016/0226085 A1* | 8/2016 | Kuribayashi | H01M 8/2425 |
| 2016/0276680 A1* | 9/2016 | Kuribayashi | H01M 8/0273 |
| 2016/0372758 A1* | 12/2016 | Sato | H01M 8/0236 |

FOREIGN PATENT DOCUMENTS

| | | |
|---|---|---|
| JP | 2007-194025 A | 8/2007 |
| JP | 2010-80151 A | 4/2010 |
| JP | 2011-99159 A | 5/2011 |
| JP | 2014-29838 A | 2/2014 |
| JP | 2015-32558 A | 2/2015 |
| JP | 2015-35418 A | 2/2015 |
| WO | WO-2014034608 A1 * | 3/2014 .......... H01M 8/0273 |

OTHER PUBLICATIONS

Communication dated Jul. 4, 2017, issued by the Japanese Patent Office in counterpart Japanese application No. 2016-035136.

M.L. Fontaine et al. "Composition and porosity graded $La_{2-x}NiO_{4+\delta}$ ($x>=0$) interlayers for SOFC: Control of the microstructure via a sol-gel process" Journal of Power Sources, vol. 156, No. 1, May 19, 2006 (pp. 33-38).

Junwei Wu et al. "The performance of solid oxide fuel cells with Mn—Co electroplated interconnect as cathode current collector" Journal of Power Sources, vol. 189, No. 2, Apr. 15, 2009 (pp. 1106-1113).

Communication dated Jun. 13, 2019, from the European Patent Office in counterpart European Application No. 16891607.0.

\* cited by examiner

| Sample | Relation of porosity | Relation of thermal expansion coefficient | Condition 1 | Condition 2 |
|---|---|---|---|---|
| A | 1 | 11 | ○ | ○ |
| B | 1 | 12 | ○ | X |
| C | 1 | 13 | ○ | X |
| D | 2 | 11 | X | X |
| E | 2 | 12 | X | X |
| F | 2 | 13 | X | X |
| G | 3 | 11 | X | X |
| H | 3 | 12 | X | X |
| I | 3 | 13 | X | X |

FUEL CELL POWER GENERATION UNIT AND FUEL CELL STACK

CROSS REFERENCE TO RELATED APPLICATIONS

This application is a National Stage of International Application No. PCT/JP2016/083446 filed Nov. 10, 2016, claiming priority based on Japanese Patent Application No. 2016-035136, filed Feb. 26, 2016.

TECHNICAL FIELD

A technique disclosed in the present specification relates to a fuel cell.

BACKGROUND ART

A known type of a fuel cell is a solid oxide fuel cell (hereinafter may be referred to as "SOFC") which contains a solid oxide as an electrolyte. A fuel cell electricity generation unit (hereinafter may be referred to simply as an "electricity generation unit"), which is the smallest unit of electricity generation of an SOFC, includes a unit cell including an electrolyte layer and electrodes (a cathode and an anode), and electrically conductive current collecting members disposed on the cathode and anode sides of the unit cell for collecting electric power generated in the unit cell.

Such a current collecting member is formed of a Cr (chromium)-containing metal (e.g., ferritic stainless steel). Exposure of the current collecting member to a high-temperature atmosphere (e.g., 700° C. to 1,000° C.) during operation of the SOFC may cause a phenomenon called "Cr diffusion"; i.e., release and diffusion of Cr from the surface of the current collecting member. Deposition of diffused Cr onto the surface of the cathode causes a phenomenon called "Cr poisoning of cathode"; i.e., a reduction in electrode reaction rate at the cathode. There has been known a technique of covering the surface of the current collecting member with a coating so as to prevent occurrence of Cr poisoning of the cathode (see, for example, Patent Document 1). The cathode is bonded to the coating-covered current collecting member by means of an electrically conductive bonding layer.

PRIOR ART DOCUMENT

Patent Document

Patent Document 1: Japanese Patent Application Laid-Open (kokai) No. 2011-99159

SUMMARY OF THE INVENTION

Problem to be Solved by the Invention

In the aforementioned conventional configuration, for example, a variation in temperature distribution in the SOFC may cause a thermal stress in the interior of the coating, the bonding layer, or the cathode or at the interfaces between these members, resulting in occurrence of cracks in the interior of each of the members or at the interfaces between the members. Such a problem is common with a configuration wherein the current collecting member is formed of a Cr-containing metal, and also with a configuration wherein the surface of the current collecting member is covered with a coating.

The present specification discloses a technique capable of solving the aforementioned problems.

Means for Solving the Problem

A technique disclosed in the present specification can be implemented in the following modes.

(1) A fuel cell electricity generation unit disclosed in the present specification comprises a unit cell including an electrolyte layer containing a solid oxide, and a cathode and an anode which face each other with the electrolyte layer intervening therebetween; an electrically conductive current collecting member disposed on the cathode side of the unit cell; an electrically conductive coating which covers the surface of the current collecting member; and an electrically conductive bonding layer which bonds the cathode to the current collecting member covered with the coating, the fuel cell electricity generation unit being characterized in that the following relationship is satisfied: a porosity of the coating<a porosity of the bonding layer<a porosity of the cathode. According to the present fuel cell electricity generation unit, the three sequentially disposed members (i.e., the coating, the bonding layer, and the cathode) can be provided with a porosity gradient, and thus a thermal stress (caused by, for example, a variation in temperature distribution) can be relaxed in the interior of each of the members or at the interfaces between the members. Thus, occurrence of cracks can be prevented in the interior of each of the members or at the interfaces between the members.

(2) The fuel cell electricity generation unit may be configured such that the following relationship is satisfied: a thermal expansion coefficient of a material for forming the coating≤a thermal expansion coefficient of a material for forming the bonding layer<a thermal expansion coefficient of a material for forming the cathode. According to the present fuel cell electricity generation unit, the materials for forming three sequentially disposed members (i.e., the coating, the bonding layer, and the cathode) can be provided with a thermal expansion coefficient gradient, and thus a thermal stress (caused by, for example, a variation in temperature distribution and the difference in thermal expansion coefficient between the materials for forming the members) can be relaxed in the interior of each of the members or at the interfaces between the members. Thus, occurrence of cracks can be prevented in the interior of each of the members or at the interfaces between the members.

(3) The fuel cell electricity generation unit may be configured such that the following relationship is satisfied: (the porosity of the bonding layer−the porosity of the coating)≤(the porosity of the cathode−the porosity of the bonding layer). According to the present fuel cell electricity generation unit, Cr diffusion from the surface of the current collecting member can be effectively prevented by reducing the porosity of the coating while preventing occurrence of cracks in the interior of each of the members or at the interfaces between the members.

(4) The fuel cell electricity generation unit may be configured such that the following relationship is satisfied: (the porosity of the bonding layer−the porosity of the coating)>(the porosity of the cathode−the porosity of the bonding layer). According to the present fuel cell electricity generation unit, an increase in the diffusion resistance of an oxidizer gas (through adjustment of the porosity of the bonding layer to be higher than that of the coating) can be prevented while more effectively preventing occurrence of cracks in the interior of each of the members or at the interfaces between the members.

(5) The fuel cell electricity generation unit may be configured such that the coating and the bonding layer are formed of a spinel oxide. According to the present fuel cell electricity generation unit, element diffusion is likely to occur at the interface between the coating and the bonding layer, since the coating and the bonding layer are formed of a spinel oxide. Accordingly, the thermal expansion difference is reduced at the interface between the coating and the bonding layer. Thus, occurrence of cracks can be prevented at the interface between the coating and the bonding layer, and poisoning of the cathode can be effectively prevented by means of the coating, thereby preventing a reduction in the conductivity of the coating and the bonding layer.

The technique disclosed in the present specification can be implemented in various modes; for example, a fuel cell electricity generation unit, a fuel cell stack including the fuel cell electricity generation unit, an electricity generation module including the fuel cell stack, and a fuel cell system including the electricity generation module.

MODES FOR CARRYING OUT THE INVENTION

A. Embodiment (Structure of Fuel Cell Stack 100)

Figure 1:
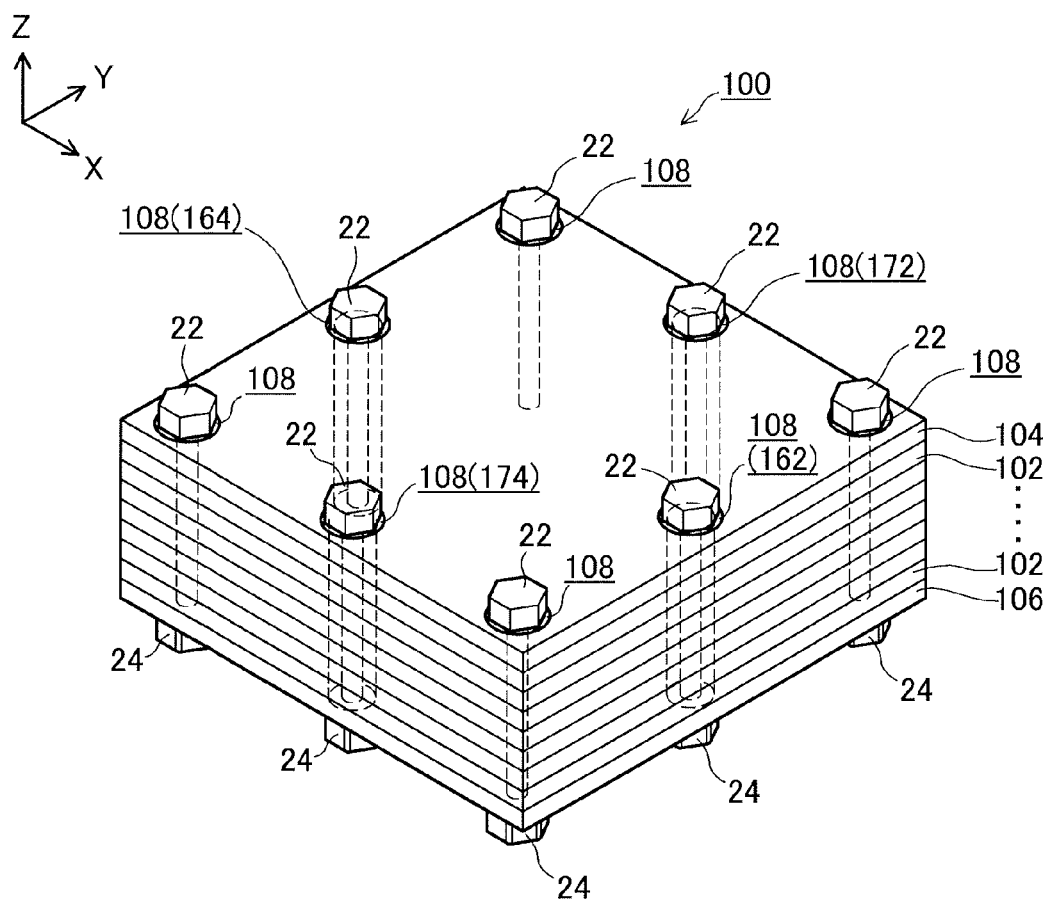
FIG. 1 Perspective view schematically illustrating the external structure of a fuel cell stack 100.

FIG. 1 is a perspective view schematically illustrating the external structure of a fuel cell stack 100. FIG. 1 shows mutually orthogonal X-axis, Y-axis, and Z-axis for specifying directions. In the present specification, for the sake of convenience, the positive Z-axis direction is called the upward direction, and the negative Z-axis direction is called the downward direction; however, the directions corresponding to these axes may vary depending on the orientation of the fuel cell stack 100. The same shall apply to FIG. 2 and subsequent drawings.

The fuel cell stack 100 includes a plurality of fuel cell electricity generation units (hereinafter may be referred to simply as "electricity generation units") 102 that are arranged in the vertical direction, and a pair of end plates 104 and 106 that are disposed so as to sandwich the electricity generation units 102 in the vertical direction. The number of the electricity generation units 102 included in the fuel cell stack 100 shown in FIG. 1 is a mere example and is determined as appropriate in accordance with, for example, a required output voltage of the fuel cell stack 100.

The fuel cell stack 100 has a plurality of (eight in the present embodiment) through holes 108 formed therein and extending in the vertical direction through peripheral portions about the Z-axis direction. The component layers of the fuel cell stack 100 (i.e., the electricity generation units 102 and the paired end plates 104 and 106) are clamped and fixed by means of bolts 22 inserted into the through holes 108 and nuts 24 engaged with the bolts 22.

The outside diameter of a shaft portion of each bolt 22 is smaller than the inside diameter of each through hole 108. Accordingly, a space is secured between the outer circumferential surface of the shaft portion of each bolt 22 and the inner circumferential surface of each through hole 108. A space defined by the through hole 108 located at around the midpoint of one side of the perimeter about the Z-axis direction of the fuel cell stack 100 (a side at the positive side in the X-axis direction of two sides in parallel with the Y-axis) functions as an oxidizer gas supply manifold 162 for supplying oxidizer gas OG to the electricity generation units 102, whereas a space defined by the through hole 108 located at around the midpoint of the other side opposite the above side (a side at the negative side in the X-axis direction of two sides in parallel with the Y-axis) functions as an oxidizer gas discharge manifold 164 for discharging oxidizer offgas OOG (i.e., unreacted oxidizer gas OG) from the electricity generation units 102. A space defined by the through hole 108 located at around the midpoint of another side of the perimeter about the Z-axis direction of the fuel cell stack 100 (a side at the positive side in the Y-axis direction of two sides in parallel with the X-axis) functions as a fuel gas supply manifold 172 for supplying fuel gas FG to the electricity generation units 102, whereas a space defined by the through hole 108 located at around the midpoint of the other side opposite the above side (a side at the negative side in the Y-axis direction of two sides in parallel with the X-axis) functions as a fuel gas discharge manifold 174 for discharging fuel offgas FOG (i.e., unreacted fuel gas FG) from the electricity generation units 102. In the present embodiment, air is used as the oxidizer gas OG, and hydrogen-rich gas reformed from city gas is used as the fuel gas FG.

(Structure of End Plates 104 and 106)

The paired end plates 104 and 106 are electrically conductive members each having a rectangular flat-plate shape and are formed of, for example, stainless steel. One end plate 104 is disposed on the uppermost electricity generation unit 102, and the other end plate 106 is disposed under the lowermost electricity generation unit 102. A plurality of the electricity generation units 102 are held under pressure between the paired end plates 104 and 106. The upper end plate 104 (or another member connected to the upper end plate 104) functions as a positive output terminal of the fuel cell stack 100, and the lower end plate 106 (or another member connected to the lower end plate 106) functions as a negative output terminal of the fuel cell stack 100.

(Structure of Electricity Generation Unit 102)

Figure 2:
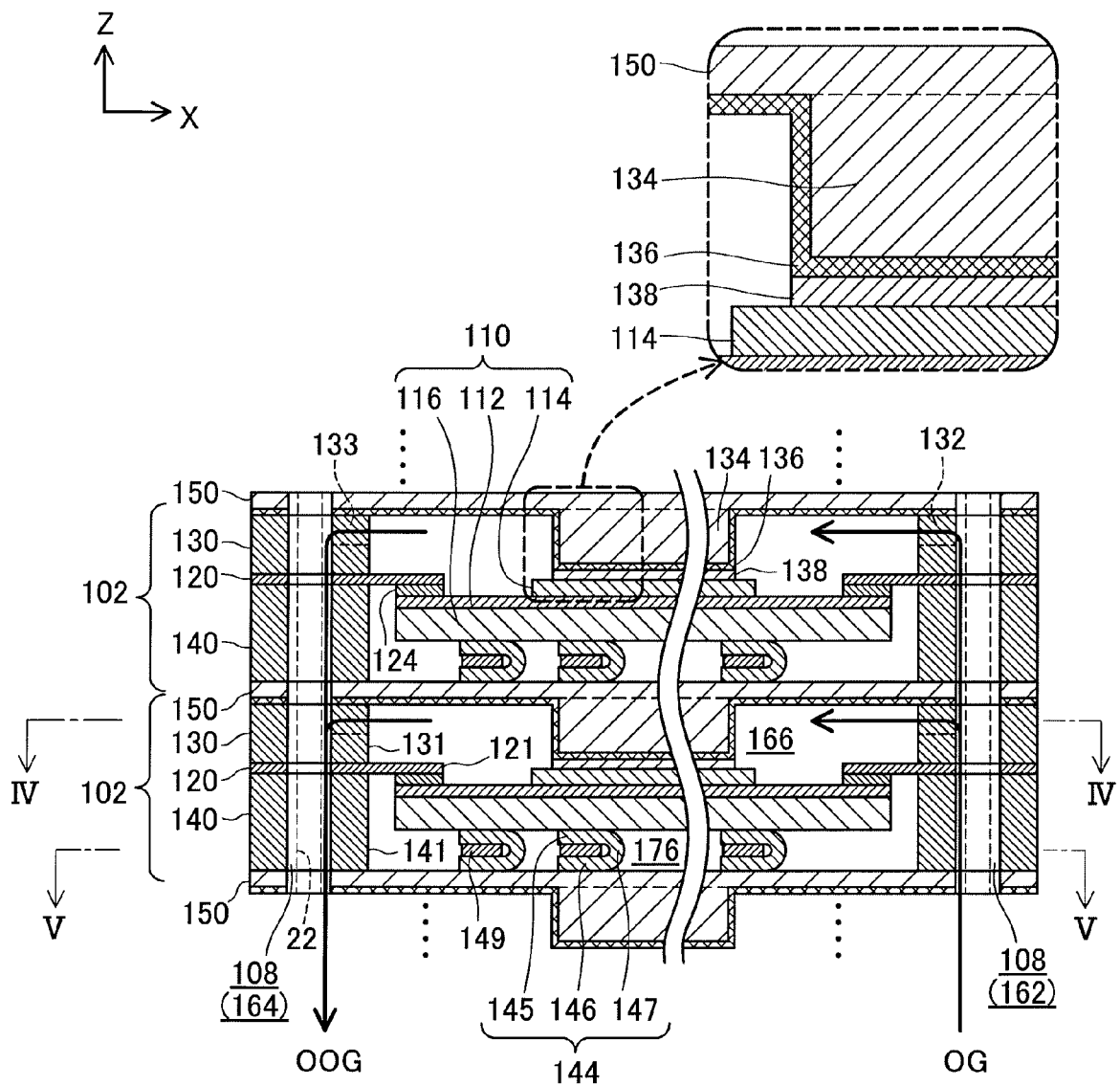
FIG. 2 Explanatory view schematically illustrating the structure of an electricity generation unit 102.
Figure 3:
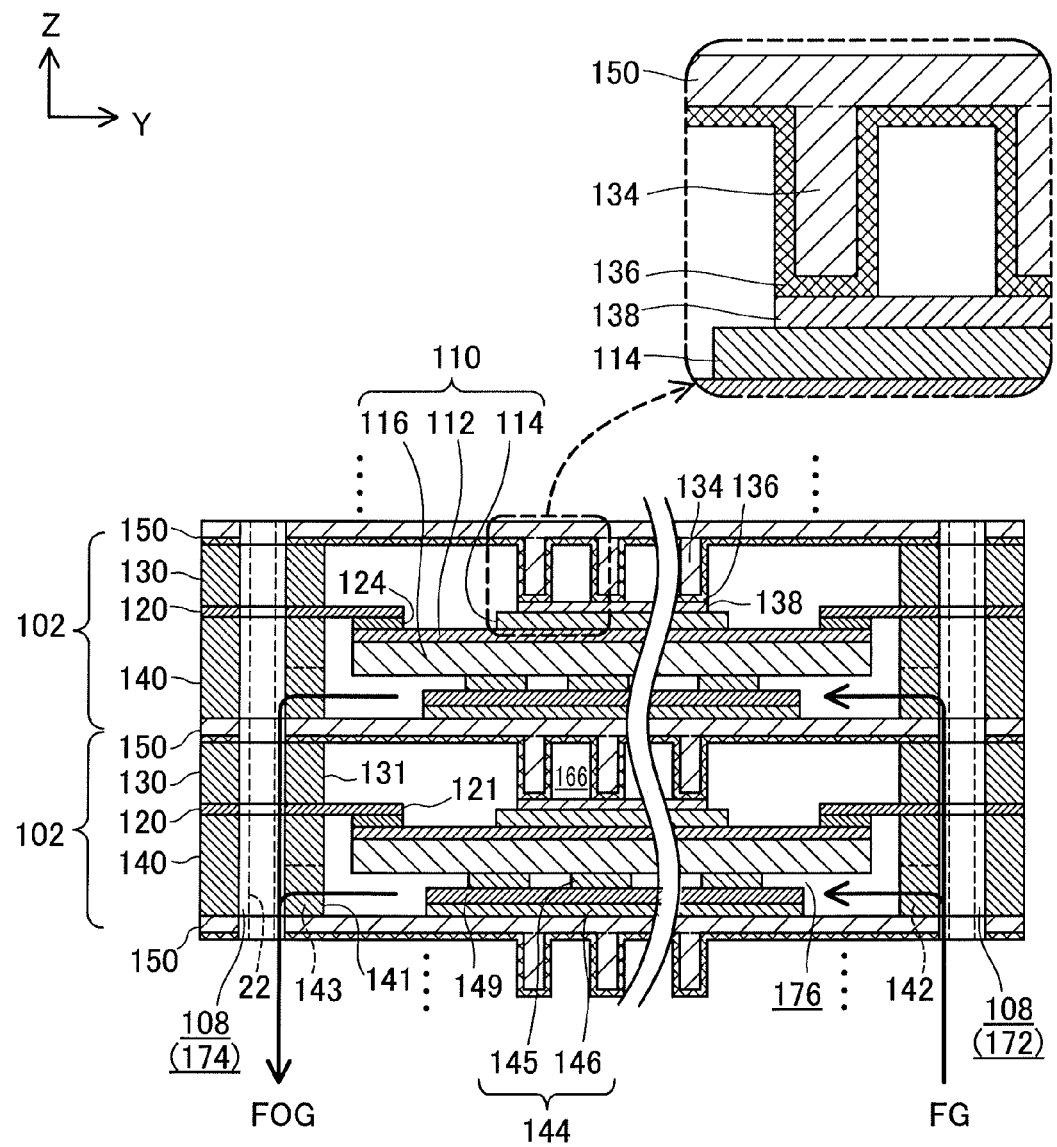
FIG. 3 Explanatory view schematically illustrating the structure of the electricity generation unit 102.
Figure 4:
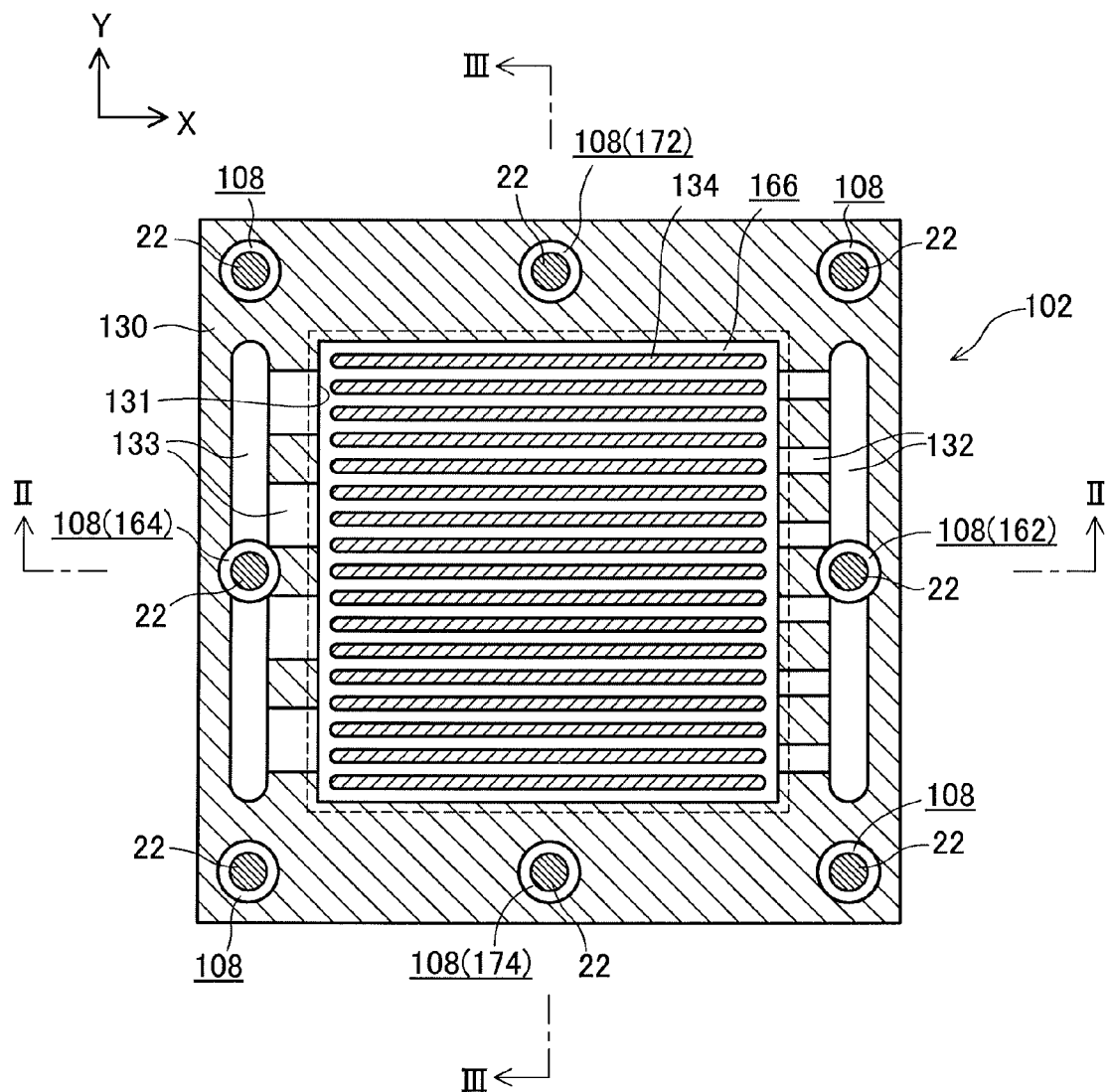
FIG. 4 Explanatory view schematically illustrating the structure of the electricity generation unit 102.
Figures 5, 6:
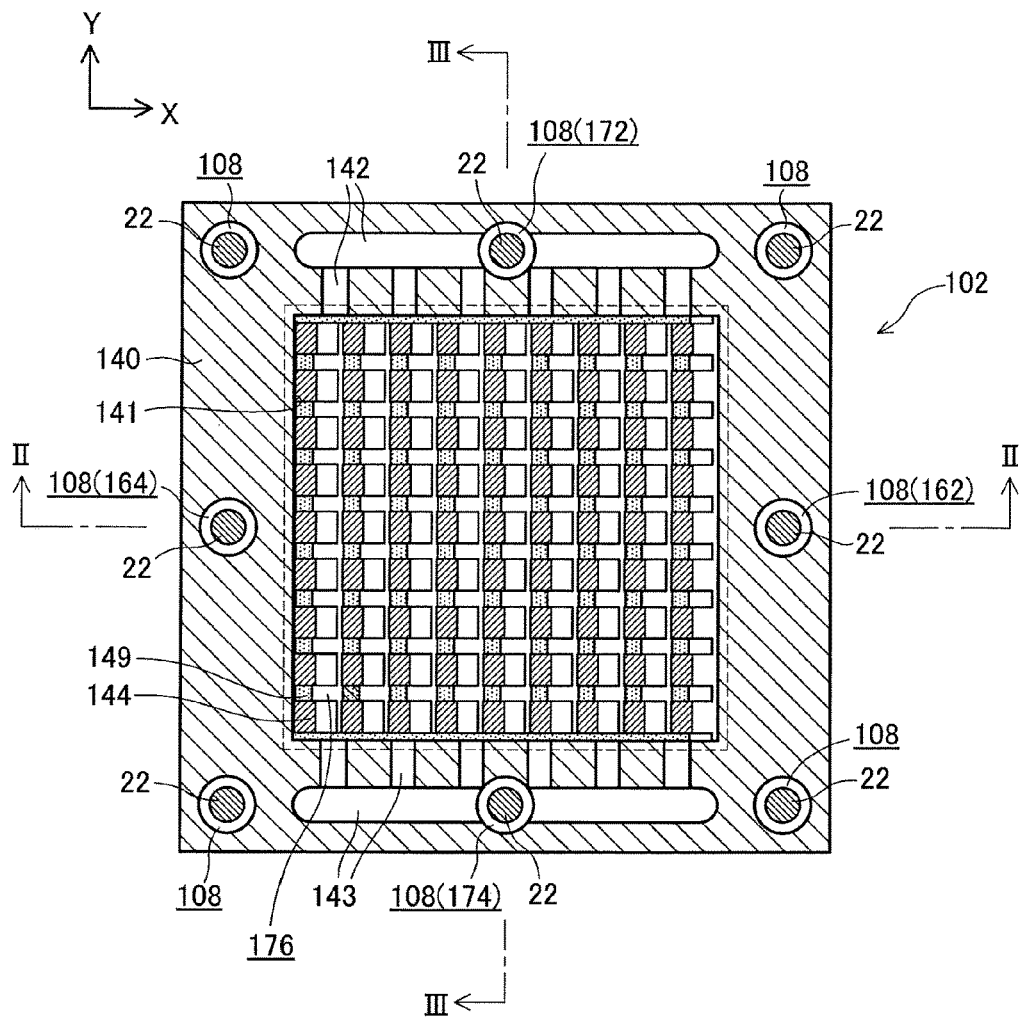
FIG. 5 Explanatory view schematically illustrating the structure of the electricity generation unit 102.
FIG. 6 Explanatory table illustrating the results of performance evaluation.

FIGS. 2 to 5 are explanatory views schematically illustrating the structure of the electricity generation unit 102. FIG. 2 illustrates a section of the electricity generation unit 102 taken along line II-II of FIGS. 4 and 5. FIG. 3 illustrates a section of the electricity generation unit 102 taken along line III-III of FIGS. 4 and 5. FIG. 4 illustrates the planar structure of the electricity generation unit 102 at the position of line IV-IV of FIG. 2. FIG. 5 illustrates the planar structure of the electricity generation unit 102 at the position of line V-V of FIG. 2.

As shown in FIGS. 2 and 3, the electricity generation unit 102 serving as the smallest unit of electricity generation includes a unit cell 110, a separator 120, a cathode-side frame 130, a cathode-side current collector 134, an anode-side frame 140, an anode-side current collector 144, and a pair of interconnectors 150 serving as the uppermost and lowermost layers of the electricity generation unit 102. Holes corresponding to the through holes 108 into which the aforementioned bolts 22 are inserted are formed in peripheral portions about the Z-axis direction of the separator 120, the cathode-side frame 130, the anode-side frame 140, and the interconnectors 150.

The interconnector 150 is an electrically conductive member having a rectangular flat-plate shape and is formed of a Cr (chromium)-containing metal (e.g., ferritic stainless steel). The interconnector 150 secures electrical conductivity between the electricity generation units 102 and prevents mixing of reaction gases between the electricity generation units 102. One interconnector 150 is shared by the two adjacent electricity generation units 102. That is, the upper interconnector 150 of a certain electricity generation unit 102 also serves as a lower interconnector 150 of the upper adjacent electricity generation unit 102. Since the fuel cell stack 100 has the paired end plates 104 and 106, the uppermost electricity generation unit 102 of the fuel cell stack 100 is not necessarily provided with the upper interconnector 150, and the lowermost electricity generation unit 102 is not necessarily provided with the lower interconnector 150.

The unit cell 110 includes an electrolyte layer 112, and a cathode 114 and an anode 116 which face each other with the electrolyte layer 112 intervening therebetween. The unit cell 110 of the present embodiment is an anode-support-type unit cell in which the anode 116 supports the electrolyte layer 112 and the cathode 114.

The electrolyte layer 112 is a member having a rectangular flat-plate shape and is formed of a solid oxide; for example, YSZ (yttria-stabilized zirconia), ScSZ (scandia-stabilized zirconia), SDC (samarium-doped ceria), GDC (gadolinium-doped ceria), or a perovskite oxide. The cathode 114 is a member having a size smaller than that of the electrolyte layer 112 and a rectangular flat-plate shape and is formed of, for example, a perovskite oxide (e.g., LSCF (lanthanum strontium cobalt ferrite), LSM (lanthanum strontium manganese oxide), or LNF (lanthanum nickel ferrite)). The anode 116 is a member having approximately the same size as the electrolyte layer 112 and a rectangular flat-plate shape and is formed of, for example, Ni (nickel), a cermet of Ni and ceramic powder, or an Ni-based alloy. Thus, the unit cell 110 of the present embodiment is a solid oxide fuel cell (SOFC) which contains a solid oxide as an electrolyte.

The separator 120 is a frame member having a rectangular through hole 121 formed in a central region thereof and is formed of, for example, a metal. A portion of the separator 120 around the through hole 121 faces a peripheral portion of the surface on the cathode 114 side of the electrolyte layer 112. The separator 120 is bonded to the electrolyte layer 112 (unit cell 110) by means of a bonding member 124 formed of a brazing material (e.g., Ag brazing material) and disposed between the facing portion and the electrolyte layer 112. The separator 120 separates the cathode chamber 166 which faces the cathode 114, and the anode chamber 176 which faces the anode 116, from each other, thereby preventing gas leakage from one electrode side to the other electrode side through a peripheral portion of the unit cell 110. The unit cell 110 to which the separator 120 is bonded is also called a separator-attached unit cell.

The cathode-side frame 130 is a frame member having a rectangular through hole 131 formed in a central region thereof, and is formed of an insulator (e.g., mica). The cathode-side frame 130 is in contact with a peripheral portion of the surface of the separator 120 on the side opposite the electrolyte layer 112 and with a peripheral portion of the surface of the interconnector 150 on the side toward the cathode 114. The cathode-side frame 130 secures the cathode chamber 166 between the cathode 114 and the interconnector 150 (see FIGS. 2 and 3), and electrically insulates the paired interconnectors 150 included in the electrically generation unit 102 from each other. As shown in FIG. 4, the cathode-side frame 130 has an oxidizer gas supply communication hole 132 formed therein and adapted to establish communication between the oxidizer gas supply manifold 162 and the cathode chamber 166, and an oxidizer gas discharge communication hole 133 formed therein and adapted to establish communication between the cathode chamber 166 and the oxidizer gas discharge manifold 164.

The anode-side frame 140 is a frame member having a rectangular through hole 141 formed in a central region thereof, and is formed of, for example, a metal. The anode-side frame 140 is in contact with a peripheral portion of the surface of the separator 120 on the side toward the electrolyte layer 112 and with a peripheral portion of the surface of the interconnector 150 on the side toward the anode 116. The anode-side frame 140 secures the anode chamber 176 between the anode 116 and the interconnector 150 (see FIGS. 2 and 3). As shown in FIG. 5, the anode-side frame 140 has a fuel gas supply communication hole 142 formed therein and adapted to establish communication between the fuel gas supply manifold 172 and the anode chamber 176, and a fuel gas discharge communication hole 143 formed therein and adapted to establish communication between the anode chamber 176 and the fuel gas discharge manifold 174.

As shown in FIGS. 2 and 5, the anode-side current collector 144 is disposed within the anode chamber 176. The anode-side current collector 144 includes an interconnector facing portion 146, a plurality of electrode facing portions 145, and a connection portion 147 which connects each electrode facing portion 145 to the interconnector facing portion 146. The anode-side current collector 144 is formed of, for example, nickel, a nickel alloy, or stainless steel. Each electrode facing portion 145 is in contact with the surface of the anode 116 on the side opposite the electrolyte layer 112, and the interconnector facing portion 146 is in contact with the surface of the interconnector 150 on the side toward the anode 116. Thus, the anode-side current collector 144 electrically connects the anode 116 to the interconnector 150.

In the present embodiment, a spacer 149 formed of, for example, mica is disposed between the electrode facing portion 145 and the interconnector facing portion 146. Thus, the anode-side current collector 144 follows the deformation of the electricity generation unit 102 caused by a temperature cycle and a variation in pressure of reaction gas, thereby maintaining a good electrical connection between the anode 116 and the interconnector 150 via the anode-side current collector 144.

The cathode-side current collector 134 is disposed within the cathode chamber 166. The cathode-side current collector 134 is composed of a plurality of rectangular columnar electrically conductive members disposed at predetermined intervals (see FIGS. 3 and 4). The cathode-side current collector 134 is formed of a Cr (chromium)-containing metal, such as ferritic stainless steel. The cathode-side current collector 134 is in contact with the surface of the cathode 114 on the side opposite the electrolyte layer 112 and with the surface of the interconnector 150 on the side toward the cathode 114. Thus, the cathode-side current collector 134 electrically connects the cathode 114 to the interconnector 150. In the present embodiment, the cathode-side current collector 134 and the interconnector 150 are integrally formed as a unitary member. That is, a flat-plate-shape portion of the unitary member perpendicular to the vertical direction (Z-axis direction) functions as the interconnector 150, and the rectangular columnar portions formed on the flat-plate-shape portion on the side toward the cathode 114 function as the cathode-side current collector 134. The cathode-side current collector 134 is an example of the current collecting member.

As shown in FIGS. 2 and 3, the surface of the cathode-side current collector 134 is covered with an electrically conductive coating 136. The coating 136 is formed of, for example, a perovskite oxide or a spinel oxide (e.g., $Mn_2CoO_4$, $MnCo_2O_4$, $ZnCo_2O_4$, $ZnMnCoO_4$, or $CuMn_2O_4$). The coating 136 is formed through application of a coating paste onto the surface of the cathode-side current collector 134, and subsequent firing of the paste under predetermined conditions. In the present embodiment, since the cathode-side current collector 134 and the interconnector 150 are integrally formed as a unitary member, the surface of the interconnector 150 on the side toward the cathode 114 is also covered with the coating 136.

The cathode 114 and the cathode-side current collector 134 covered with the coating 136 are bonded together by means of an electrically conductive bonding layer 138. As in the case of the coating 136, the bonding layer 138 is formed of, for example, a perovskite oxide or a spinel oxide (e.g., $Mn_2CoO_4$, $MnCo_2O_4$, $ZnCo_2O_4$, $ZnMnCoO_4$, or $CuMn_2O_4$). The bonding layer 138 is formed through application of a paste for the bonding layer onto a bonding site between the cathode 114 and the cathode-side current collector 134 covered with the coating 136, and subsequent firing of the paste under predetermined conditions. The bonding layer 138 electrically connects the cathode 114 to the cathode-side current collector 134 covered with the coating 136. According to the previous description, the cathode-side current collector 134 is in contact with the surface of the cathode 114. Strictly speaking, the cathode-side current collector 134 is in contact with the surface of the cathode 114 by means of the coating 136 and the bonding layer 138 intervening therebetween.

(Operation of Fuel Cell Stack 100)

As shown in FIG. 2, when the oxidizer gas OG is supplied to the oxidizer gas supply manifold 162, the oxidizer gas OG is supplied from the oxidizer gas supply manifold 162 to the cathode chambers 166 through the oxidizer gas supply communication holes 132 of the electricity generation units 102. As shown in FIG. 3, when the fuel gas FG is supplied to the fuel gas supply manifold 172, the fuel gas FG is supplied from the fuel gas supply manifold 172 to the anode chambers 176 through the fuel gas supply communication holes 142 of the electricity generation units 102.

When the oxidizer gas OG is supplied to the cathode chamber 166 of each electricity generation unit 102, whereas the fuel gas FG is supplied to the anode chamber 176 of each electricity generation unit 102, the unit cell 110 generates electricity through the electrochemical reaction between the oxidizer gas OG and the fuel gas FG. In each electricity generation unit 102, the cathode 114 of the unit cell 110 is electrically connected to one interconnector 150 through the cathode-side current collector 134 (and the coating 136 and the bonding layer 138), whereas the anode 116 is electrically connected to the other interconnector 150 through the anode-side current collector 144. Also, a plurality of the electricity generation units 102 included in the fuel cell stack 100 are connected in series. Accordingly, electric energy generated in the electricity generation units 102 is output from the end plates 104 and 106 which function as output terminals of the fuel cell stack 100. In the SOFC, since electricity is generated at a relatively high temperature (e.g., 700° C. to 1,000° C.), the fuel cell stack 100 may be heated by a heater from startup till the high temperature can be maintained by means of heat generated as a result of generation of electricity.

As shown in FIG. 2, the oxidizer offgas OOG (i.e., the oxidizer gas OG that has not been used for electricity generation reaction in the electricity generation units 102) is discharged from the cathode chambers 166 to the outside of the fuel cell stack 100 through the oxidizer gas discharge communication holes 133 and the oxidizer gas discharge manifold 164. As shown in FIG. 3, the fuel offgas FOG (i.e., the fuel gas OG that has not been used for electricity generation reaction in the electricity generation units 102) is discharged from the anode chambers 176 to the outside of the fuel cell stack 100 through the fuel gas discharge communication holes 143 and the fuel gas discharge manifold 174.

(Performance Evaluation)

In each electricity generation unit 102 included in the fuel cell stack 100 and having the aforementioned structure, for example, a variation in temperature distribution may cause a thermal stress around the bonding site between the cathode-side current collector 134 and the cathode 114; specifically, in the interior of each of the following members (the coating 136, the bonding layer 138, and the cathode 114) or at the interfaces between these members, resulting in cracking in the interior of each of the members or at the interfaces between the members. The present inventor focused on the porosities and thermal expansion coefficients of the coating 136, the bonding layer 138, and the cathode 114, and prepared samples having different porosities and thermal expansion coefficients. The samples were evaluated for the prevention of occurrence of cracks.

FIG. 6 is an explanatory table illustrating the results of performance evaluation. The performance evaluation was carried out on nine samples (samples A to I) of electricity generation unit 102. These samples have different relationships in porosity and thermal expansion coefficient between the coating 136, the bonding layer 138, and the cathode 114. The relationships will be detailed below.

Figure 7:
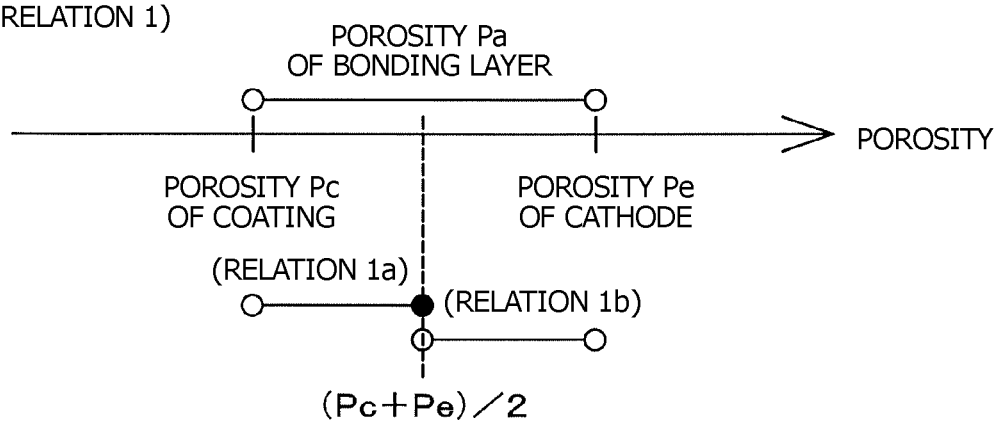
FIG. 7 Explanatory drawing illustrating the relationship in porosity between a coating 136, a bonding layer 138, and a cathode 114.
Figure 7:
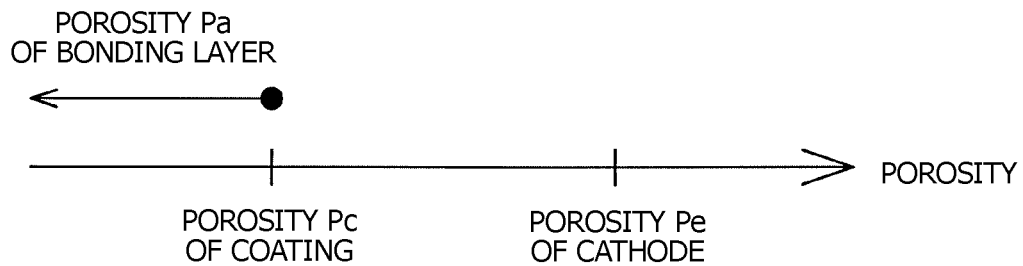
Figure 7:
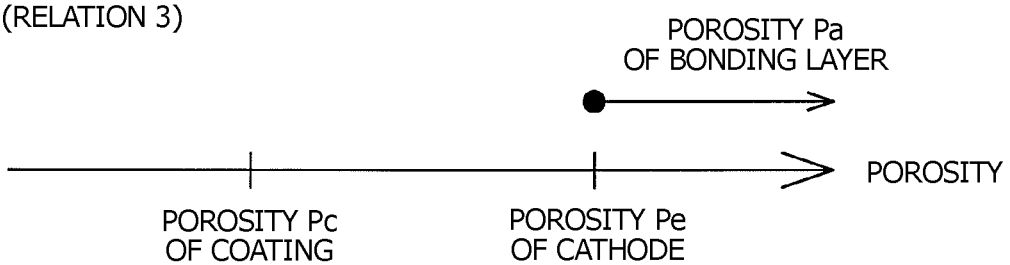

FIG. 7 is an explanatory drawing illustrating the relationship in porosity between the coating 136, the bonding layer 138, and the cathode 114. In FIG. 7, the right side corresponds to high porosity. The coating 136 that covers the cathode-side current collector 134 is provided for preventing Cr diffusion from the cathode-side current collector 134. Thus, the coating 136 is required to have a relatively low porosity Pc. Meanwhile, the cathode 114 is required to have a relatively high porosity Pe for increasing gas diffusion in the interior of the cathode 114 to thereby improve electricity generation performance, and for dispersing a stress due to local heating caused by gas diffusion resistance in the interior of the cathode 114. Thus, as shown in FIG. 7, the porosity Pc of the coating 136 was adjusted to be lower than the porosity Pe of the cathode 114. Based on this adjustment, three relationships in porosity between the coating 136, the bonding layer 138, and the cathode 114 were provided as follows.

Relationship 1: the porosity Pc of the coating 136<the porosity Pa of the bonding layer 138<the porosity Pe of the cathode 114

Relationship 2: the porosity Pa of the bonding layer 138≤the porosity Pc of the coating 136 (<the porosity Pe of the cathode 114)

Relationship 3: (the porosity Pc of the coating 136<) the porosity Pe of the cathode 114≤the porosity Pa of the bonding layer 138

In order to achieve a relatively high porosity Pe of the cathode 114, the cathode 114 can be formed by, for example, any of the following three methods.

a) A method involving the use of raw material powder having a relatively large particle size.

b) A method involving the incorporation of a relatively large amount of a pore-forming material (which fires and forms pores during firing; for example, resin beads or carbon powder) into raw material powder.

c) A method involving low-temperature sintering for preventing shrinkage by sintering.

In order to achieve a relatively low porosity Pc of the coating 136, the coating 136 can be formed by, for example, any of the following three methods.

a) A method involving metal plating and subsequent oxidative thermal treatment.

b) A method involving formation of spinel powder by thermal spraying.

c) A method involving spraying of spinel powder and subsequent sintering of the powder.

In order to adjust the porosity Pa of the bonding layer 138 to a desired value, the bonding layer 138 can be formed by, for example, any of the following two methods.

a) A method involving the incorporation of a pore-forming material (which fires and forms pores during firing; for example, resin beads or carbon powder) into raw material powder in an amount corresponding to a desired porosity.

b) A method involving adjustment of the binder content of a paste, sintering temperature, or sintering time for controlling the porosity.

Figure 8:
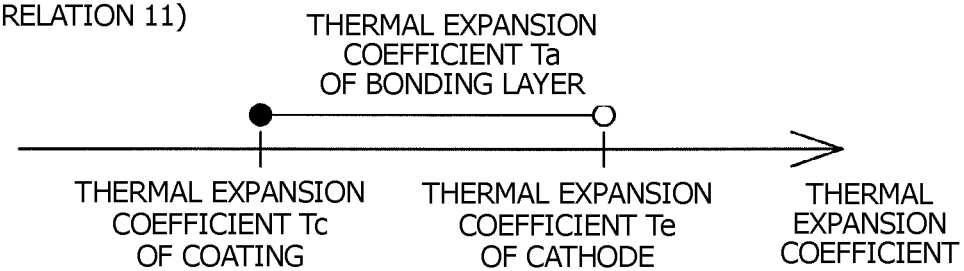
FIG. 8 Explanatory drawing illustrating the relationship in thermal expansion coefficient between the materials for forming the coating 136, the bonding layer 138, and the cathode 114.
Figure 8:
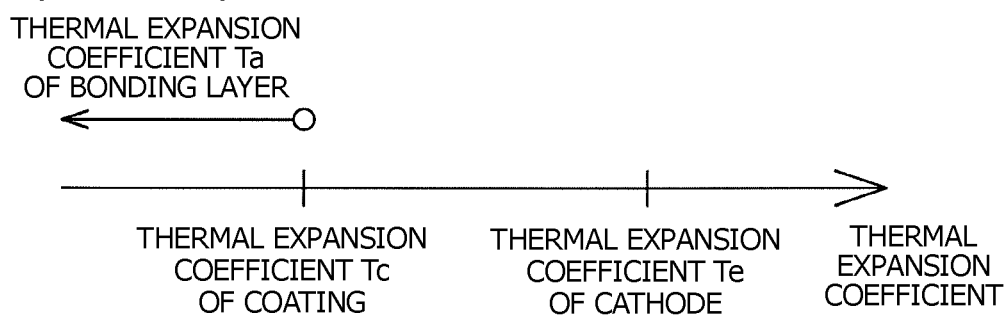
Figure 8:
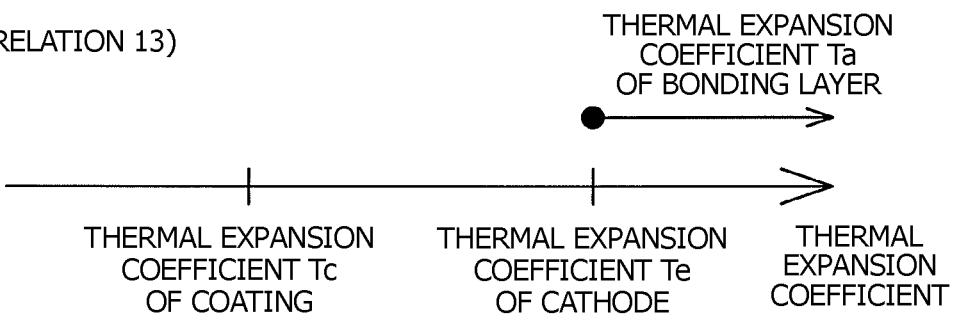

FIG. 8 is an explanatory drawing illustrating the relationship in thermal expansion coefficient between the materials for forming the coating 136, the bonding layer 138, and the cathode 114. In FIG. 8, the right side corresponds to high thermal expansion coefficient. As shown in FIG. 8, the thermal expansion coefficient Tc of the material for forming the coating 136 was adjusted to be lower than the thermal expansion coefficient Te of the material for forming the cathode 114. Based on this adjustment, three relationships in thermal expansion coefficient between the materials for forming the coating 136, the bonding layer 138, and the cathode 114 were provided as follows.

Relationship 11: the thermal expansion coefficient Tc of the coating 136≤the thermal expansion coefficient Ta of the bonding layer 138<the thermal expansion coefficient Te of the cathode 114

Relationship 12: the thermal expansion coefficient Ta of the bonding layer 138<the thermal expansion coefficient Tc of the coating 136 (<the thermal expansion coefficient Te of the cathode 114)

Relationship 13: (the thermal expansion coefficient Tc of the coating 136<) the thermal expansion coefficient Te of the cathode 114≤the thermal expansion coefficient Ta of the bonding layer 138

The aforementioned relationship 11 can be satisfied through, for example, formation of the cathode 114 from a specific perovskite oxide (e.g., LSCF), formation of the coating 136 from $Mn_2CoO_4$ (i.e., a spinel oxide), and formation of the bonding layer 138 from $MnCo_2O_4$ (i.e., a spinel oxide). The aforementioned relationship 13 can be satisfied through, for example, formation of the cathode 114 and the bonding layer 138 from a specific perovskite oxide, and formation of the coating 136 from $Mn_2CoO_4$ (i.e., a spinel oxide). The aforementioned relationship 12 can be satisfied through, for example, formation of the cathode 114 from a specific perovskite oxide, formation of the coating 136 from a specific spinel oxide, and formation of the bonding layer 138 from a specific spinel oxide having a thermal expansion coefficient lower than that of the material for forming the coating 136.

As shown in FIG. 6, the performance evaluation was carried out on the aforementioned nine samples prepared on the basis of different combinations of the three relationships regarding porosity and the three relationships regarding thermal expansion coefficient. Specifically, the samples were operated under the following conditions 1 and 2 for determining whether or not cracks occurred in the interior of each of the members or at the interfaces between the members. In FIG. 6, "O" indicates no occurrence of cracks, and "X" indicates occurrence of cracks.

Condition 1: Repetition of maximum (rated) electricity generation exhibiting the largest temperature distribution and minimum electricity generation exhibiting small temperature distribution in the interior of the fuel cell stack 100.

Specifically, the fuel cell stack 100 is operated for three hours for generation of a DC power of 800 W (about 750° C.) at a fuel gas flow rate of 2 L/min and an oxidizer gas flow rate of 60 L/min, and then operated for three hours for generation of a DC power of 50 W (about 650° C.) at a fuel gas flow rate of 0.5 L/min and an oxidizer gas flow rate of 15 L/min. One thousand repetitions of this operation cycle correspond to the operation under "condition 1" shown in FIG. 6.

A large temperature distribution in the fuel cell stack 100 may cause a stress (due to thermal strain), resulting in occurrence of cracks.

Condition 2: Repetition of heating from ambient temperature to the operation temperature and cooling from the operation temperature to ambient temperature in the fuel cell stack 100.

Specifically, the fuel cell stack 100 is started and heated from a temperature lower than 100° C. to a temperature equal to or higher than 700° C. and operated for three hours for generation of a DC power of 800 W (about 750° C.) at a fuel gas flow rate of 2 L/min and an oxidizer gas flow rate of 60 L/min, and then cooled to a temperature lower than 100° C. Two hundred repetitions of this operation cycle correspond to the operation under "condition 2" shown in FIG. 6.

The repetition of heating and cooling of the fuel cell stack 100 may cause a residual stress (due to thermal expansion difference), resulting in occurrence of cracks.

As shown in FIG. 6, no occurrence of cracks was determined in the three samples (samples A to C) (wherein the porosities of the members satisfy the "relationship 1") under at least condition 1. In contrast, occurrence of cracks was determined in the remaining six samples (samples D to I) under conditions 1 and 2. Conceivable reasons for this are as follows. In samples D to F (wherein the porosities satisfy the "relationship 2"; i.e., the porosity Pa of the bonding layer 138 is equal to or lower than the porosity Pc of the coating 136), thermal stress is insufficiently relaxed at the interface between the bonding layer 138 and the cathode 114, and thus cracks are likely to occur. In samples G to I (wherein the porosities satisfy the "relationship 3"; i.e., the porosity Pa of the bonding layer 138 is equal to or higher than the porosity Pe of the cathode 114), insufficient strength is provided at the interface between the bonding layer 138 and the coating 136, and cracks are likely to occur. In contrast, in samples A to C (wherein the porosities satisfy the "relationship 1"; i.e., the porosity Pa of the bonding layer 138 falls between the porosity Pc of the coating 136 and the porosity Pe of the cathode 114), the three members (the coating 136, the bonding layer 138, and the cathode 114), which are sequentially disposed in the vertical direction, can be provided with a porosity gradient, and thus a stress due to, for example, temperature distribution can be sufficiently relaxed while securing sufficient interfacial strength. Thus, occurrence of cracks can be prevented.

As shown in FIG. 6, in sample A (among samples A to C), no occurrence of cracks was determined under conditions 1 and 2. In contrast, in sample B or C, occurrence of cracks was determined under condition 2. Conceivable reasons for this are as follows. In sample A (the thermal expansion coefficients satisfy the "relationship 11"; i.e., the thermal expansion coefficient Ta of the material for forming the bonding layer 138 falls between the thermal expansion coefficient Tc of the material for forming the coating 136 and the thermal expansion coefficient Te of the material for forming the cathode 114), the materials for forming the three members (the coating 136, the bonding layer 138, and the cathode 114), which are sequentially disposed in the vertical direction, can be provided with a thermal expansion coefficient gradient, and thus a stress due to, for example, temperature distribution and a stress caused by the thermal expansion difference between the members can be sufficiently relaxed. Thus, occurrence of cracks can be more effectively prevented.

As described above, in the electricity generation unit 102 having the aforementioned structure, occurrence of cracks can be prevented in the interior of the coating 136, the bonding layer 138, or the cathode 114 or at the interfaces between these members, if the porosities of the members satisfy the relationship represented by the following formula (1):

the porosity Pc of the coating 136<the porosity Pa of the bonding layer 138<the porosity Pe of the cathode 114  (1).

In the electricity generation unit 102 having the aforementioned structure, occurrence of cracks can be more effectively prevented in the interior of the coating 136, the bonding layer 138, or the cathode 114 or at the interfaces between these members, if the thermal expansion coefficients of the materials for forming the members satisfy the relationship represented by the following formula (2):

the thermal expansion coefficient Tc of the material for forming the coating 136≤the thermal expansion coefficient Ta of the material for forming the bonding layer 138<the thermal expansion coefficient Te of the material for forming the cathode 114  (2).

As shown by the "relationship 1a" in FIG. 7, when the porosities of the members satisfy the "relationship 1" and the difference between the porosity Pa of the bonding layer 138 and the porosity Pc of the coating 136 is equal to or smaller than the difference between the porosity Pe of the cathode 114 and the porosity Pa of the bonding layer 138 (i.e., the relationship represented by the following formula (3) is satisfied), occurrence of cracks can be prevented in the interior of each of the members or at the interfaces between the members, and Cr diffusion from the cathode-side current collector 134 can be prevented by reducing the porosity of the coating 136:

(the porosity Pa of the bonding layer 138−the porosity Pc of the coating 136)≤(the porosity Pe of the cathode 114−the porosity Pa of the bonding layer 138)  (3).

As shown by the "relationship 1b" in FIG. 7, when the porosities of the members satisfy the "relationship 1" and the difference between the porosity Pa of the bonding layer 138 and the porosity Pc of the coating 136 is larger than the difference between the porosity Pe of the cathode 114 and the porosity Pa of the bonding layer 138 (i.e., the relationship represented by the following formula (4) is satisfied), occurrence of cracks can be more effectively prevented in the interior of each of the members or at the interfaces between the members while preventing an increase in the diffusion resistance of the oxidizer gas OG through adjustment of the porosity of the bonding layer 138 to be higher than that of the coating 136:

(the porosity Pa of the bonding layer 138−the porosity Pc of the coating 136)>(the porosity Pe of the cathode 114−the porosity Pa of the bonding layer 138)  (4)

A spinel oxide is less likely to react with Cr and exhibits high electrical conductivity as compared with a perovskite oxide. Thus, formation of the coating 136 and the bonding layer 138 from a spinel oxide can effectively prevent Cr poisoning of the cathode 114, and can improve the electrical conductivity between the cathode 114 and the cathode-side current collector 134.

The porosity of each member is determined as described below. Cross sections of the electricity generation unit 102 perpendicular to the direction of flow of the oxidizer gas (i.e., the X-axis direction in the present embodiment as shown in FIG. 2) are determined at three positions aligned in the direction of flow of the oxidizer gas, and SEM images (×500) including the cathode 114, the bonding layer 138, and the coating 136 are taken at any three positions of each cross section. That is, nine SEM images are prepared. In each of the SEM images, a plurality of straight lines perpendicular to the direction of array of the electricity generation units 102 (i.e., the Z-axis direction in the present embodiment) are drawn at predetermined intervals (e.g., intervals of 1 to 5 μm). The lengths of portions corresponding to pores are measured on each straight line. The ratio of the sum of the lengths of the portions to the total length of the straight line is defined as the porosity on the line. The average of the porosities on a plurality of straight lines drawn in the SEM image of each member (the cathode 114, the bonding layer 138, or the coating 136) is defined as the porosity of the member in the SEM image. Finally, the porosities determined in the nine SEM images are averaged for each member.

B. Modifications

The technique disclosed in the present specification is not limited to the above embodiment, but may be modified into various other forms without departing from the gist thereof. For example, the technique may be modified as described below.

Figure 9:
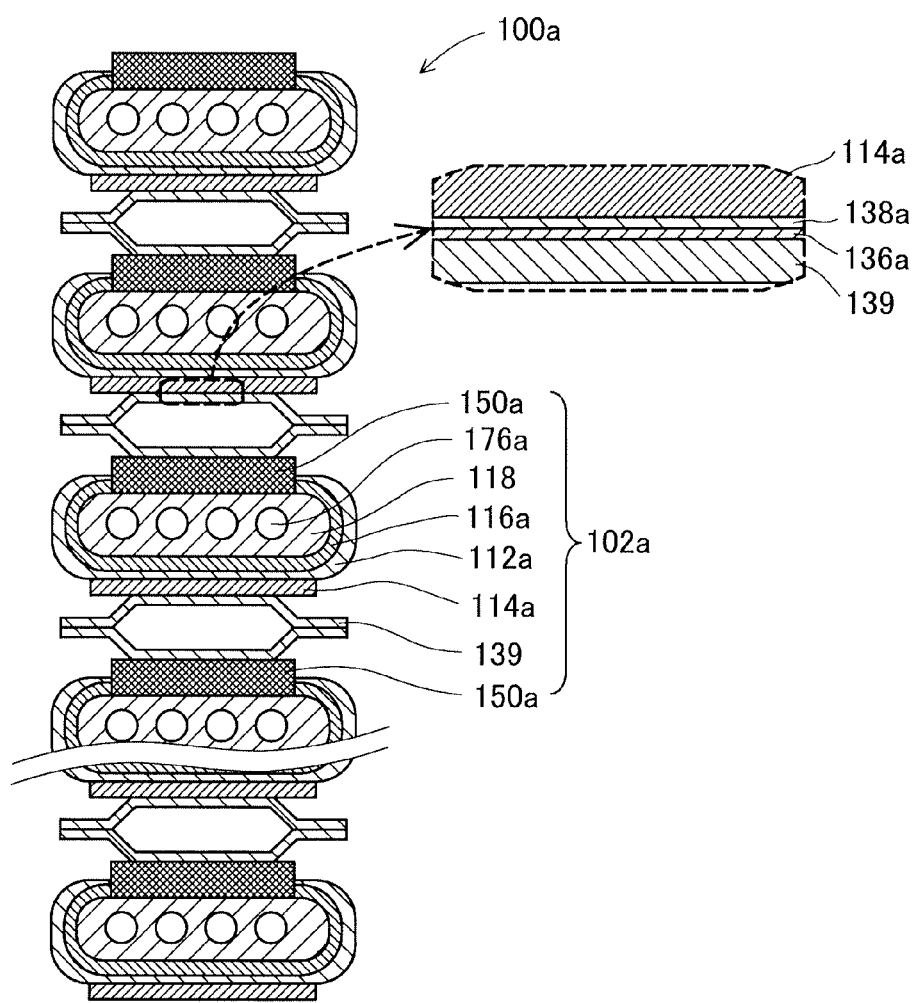
FIG. 9 Explanatory view schematically illustrating the structure of a fuel cell stack 100a according to a modification.

In the above embodiment, the fuel cell stack 100 is configured such that a plurality of electricity generation units 102 having a flat-plate shape are connected in series. The present invention is also applicable to a fuel cell stack having another configuration. FIG. 9 is an explanatory view illustrating the structure of a fuel cell stack 100a according to a modification. Similar to the above embodiment, the fuel cell stack 100a according to the modification shown in FIG. 9 is configured such that a plurality of electricity generation units 102a are connected in series. Each of the electricity generation units 102a has a structure different from that of the electricity generation unit 102 in the above embodiment. The components, materials, etc. of the fuel cell stack 100a according to the modification shown in FIG. 9 which are not described in the description of the fuel cell stack 100a are the same as the components, materials, etc. of the fuel cell stack 100 of the above-described embodiment.

Each electricity generation unit 102a according to the modification includes an electrode support 118, an anode 116a, an electrolyte layer 112a, a cathode 114a, a current collecting member 139, and a pair of interconnectors 150a serving as the uppermost and lowermost layers of the electricity generation unit 102a. The electrode support 118 is a columnar body having an approximately elliptical cross section and is formed of a porous material. The electrode support 118 has in the interior thereof a plurality of anode chambers 176a extending in the longitudinal direction of the columnar body. The anode 116a is disposed so as to cover one of the paired approximately parallel flat surface portions of the electrode support 118 and two curved surface portions connecting the ends of the flat surface portions. The electrolyte layer 112a is disposed so as to cover the surface of the anode 116a opposite the electrode support 118. The cathode 114a is disposed so as to cover a portion of the surface of the electrolyte layer 112a opposite the anode 116a, the portion corresponding to the flat surface portion of the electrode support 118. The current collecting member 139 is disposed so as to be in contact with the surface of the cathode 114a opposite the electrolyte layer 112a. The interconnectors 150a of the electricity generation unit 102a are disposed so as to be in contact with the surface of the current collecting member 139 opposite the cathode 114a and with the flat surface portion of the electrode support 118 of the adjacent electricity generation unit 102a. One interconnector 150a is shared by the two adjacent electricity generation units 102a.

As shown in FIG. 9, in each electricity generation unit 102a according to the modification, the surface of the current collecting member 139 is covered with an electrically conductive coating 136a. The cathode 114a and the current collecting member 139 covered with the coating 136a are bonded by means of an electrically conductive bonding layer 138a. The bonding layer 138a electrically connects the cathode 114a to the current collecting member 139 covered with the coating 136a.

In the electricity generation unit 102a according to the modification, if the porosities of the coating 136a, the bonding layer 138a, and the cathode 114a satisfy the relationship represented by the aforementioned formula (1), occurrence of cracks can be prevented in the interior of each of these members or at the interfaces between the members as in the case of the electricity generation unit 102 according to the above embodiment. If the thermal expansion coefficients of the materials for forming the coating 136a, the bonding layer 138a, and the cathode 114a satisfy the relationship represented by the aforementioned formula (2), occurrence of cracks can be more effectively prevented in the interior of each of these members or at the interfaces between the members.

In the modification shown in FIG. 9, the porosities of the members are determined by the same method as described in the above embodiment. The direction of array of the electricity generation units 102a corresponds to the vertical direction of FIG. 9, and the direction of flow of the oxidizer gas corresponds to the direction perpendicular to the drawing plane of FIG. 9.

In the above embodiment, the electrolyte layer 112 is formed of a solid oxide. The electrolyte layer 112 may contain an additional material besides the solid oxide. The materials for forming the members in the above embodiment are a mere example, and the members may be formed of other materials. In the above embodiment, the cathode-side current collector 134 is formed of a Cr-containing metal. However, the cathode-side current collector 134 may be formed of another material, so long as it is covered with the coating 136.

In at least one of a plurality of the electricity generation units 102 included in the fuel cell stack 100, if the porosities of the members satisfy the relationship represented by the aforementioned formula (1), occurrence of cracks can be prevented in the interior of each of the members or at the interfaces between the members at least in that electricity generation unit 102. In at least one of a plurality of the electricity generation units 102 included in the fuel cell stack 100, if the thermal expansion coefficients of the materials for forming the members satisfy the relationship represented by the aforementioned formula (2), occurrence of cracks can be effectively prevented in the interior of each of the members or at the interfaces between the members at least in that electricity generation unit 102.

In the above embodiment, a reaction preventing layer formed of, for example, ceria may be disposed between the electrolyte layer 112 and the cathode 114, thereby preventing an increase in the electric resistance between the electrolyte layer 112 and the cathode 114 due to reaction of a metal (e.g., zirconium) contained in the electrolyte layer 112 with a metal (e.g., strontium) contained in the cathode 114. In the above embodiment, the cathode-side current collector 134 and the adjacent interconnector 150 may be separated from each other. The anode-side current collector 144 may have the same structure as the cathode-side current collector 134, and the anode-side current collector 144 and the adjacent interconnector 150 may be integrally formed as a unitary member. The anode-side frame 140 rather than the cathode-side frame 130 may be formed of an insulator. The cathode-side frame 130 or the anode-side frame 140 may have a multilayer structure.

In the above embodiment, the end plates 104 and 106 function as output terminals. However, electrically conductive plates disposed respectively between the end plate 104 and the electricity generation unit 102 and between the end plate 106 and the electricity generation unit 102 may function as output terminals. In the above embodiment, spaces between the outer circumferential surfaces of shaft portions of the bolts 22 and the inner circumferential surfaces of the through holes 108 are utilized as manifolds. However, axial holes may be formed in the bolts 22 for use as the manifolds. The manifolds may be provided separately from the through holes 108 into which the bolts 22 are inserted.

Description of Reference Numerals

22: bolt; 24: nut; 100 (100a): fuel cell stack; 102 (102a): fuel cell electricity generation unit; 104: end plate; 106: end plate; 108: through hole; 110: unit cell; 112 (112a): electrolyte layer; 114 (114a): cathode; 116 (116a): anode; 118:

electrode support; 120: separator; 121: through hole; 124: bonding member; 130: cathode-side frame; 131: through hole; 132: oxidizer gas supply communication hole; 133: oxidizer gas discharge communication hole; 134: cathode-side current collector; 136 (136*a*): coating; 138 (138*a*): bonding layer; 139: current collecting member; 140: anode-side frame; 141: through hole; 142: fuel gas supply communication hole; 143: fuel gas discharge communication hole; 144: anode-side current collector; 145: electrode facing portion; 146: interconnector facing portion; 147: communication portion; 149: spacer; 150 (150*a*): interconnector; 162: oxidizer gas supply manifold; 164: oxidizer gas discharge manifold; 166: cathode chamber; 172: fuel gas supply manifold; 174: fuel gas discharge manifold; 176 (176*a*): anode chamber

The invention claimed is:

1. A fuel cell electricity generation unit comprising:

a unit cell including an electrolyte layer containing a solid oxide, and a cathode and an anode which face each other with the electrolyte layer intervening therebetween;

an electrically conductive current collecting member disposed on the cathode side of the unit cell;

an electrically conductive coating, consisting of a spinel oxide, which covers the surface of the current collecting member; and an electrically conductive bonding layer which bonds the cathode to the current collecting member covered with the coating, the fuel cell electricity generation unit being characterized in that the following relationship is satisfied: a porosity of the coating<a porosity of the bonding layer<a porosity of the cathode, wherein the current collecting member is formed of a Cr-containing material, and has a plurality of cathode-side current collectors disposed at predetermined intervals, wherein respective ones of the plurality of cathode-side current collectors are bonded to the cathode via the bonding layer, and wherein the following relationship is satisfied: a thermal expansion coefficient of a material for forming the coating a thermal expansion coefficient of a material for forming the bonding layer<a thermal expansion coefficient of a material for forming the cathode.

2. A fuel cell electricity generation unit according to claim 1, wherein the following relationship is satisfied: (the porosity of the bonding layer the porosity of the coating) (the porosity of the cathode the porosity of the bonding layer).

3. A fuel cell electricity generation unit according to claim 1, wherein the following relationship is satisfied: (the porosity of the bonding layer–the porosity of the coating)>(the porosity of the cathode–the porosity of the bonding layer).

4. A fuel cell electricity generation unit according to claim 1, wherein the bonding layer is formed of a spinel oxide.

5. A fuel cell stack comprising a plurality of fuel cell electricity generation units, the fuel cell stack being characterized in that at least one of the fuel cell electricity generation units is a fuel cell electricity generation unit as recited in claim 1.

* * * * *